US012725839B2

(12) United States Patent
Lin et al.

(10) Patent No.: US 12,725,839 B2
(45) Date of Patent: Sep. 1, 2026

(54) GAS VOLUME MEASUREMENT APPARATUS

(71) Applicant: CONTEMPORARY AMPEREX TECHNOLOGY (HONG KONG) LIMITED, Hong Kong (CN)

(72) Inventors: Si Lin, Ningde (CN); Shaoteng Ren, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 401 days.

(21) Appl. No.: 18/345,217

(22) Filed: Jun. 30, 2023

(65) Prior Publication Data

US 2024/0085231 A1 Mar. 14, 2024

Related U.S. Application Data

(63) Continuation of application No. PCT/CN2022/117978, filed on Sep. 9, 2022.

(51) Int. Cl.
*H01M 10/42* (2006.01)
*G01F 22/02* (2006.01)

(52) U.S. Cl.
CPC ........ *H01M 10/4285* (2013.01); *G01F 22/02* (2013.01)

(58) Field of Classification Search
CPC .......................... G01F 22/02; H01M 10/4285
See application file for complete search history.

(56) References Cited

U.S. PATENT DOCUMENTS

2006/0081045 A1* 4/2006 Robertson ................ G01F 3/36 73/222

FOREIGN PATENT DOCUMENTS

| | | | | | |
|---|---|---|---|---|---|
| CN | 203490042 | U | * | 3/2014 | |
| CN | 204333138 | U | | 5/2015 | |
| CN | 105445667 | A | | 3/2016 | |
| CN | 206496803 | U | * | 9/2017 | ............ G01F 22/00 |
| CN | 108956370 | A | | 12/2018 | |
| CN | 110779592 | A | | 2/2020 | |
| CN | 215816008 | U | | 2/2022 | |
| CN | 216348930 | U | * | 4/2022 | ............ G01F 22/00 |
| JP | 2002313437 | A | | 10/2002 | |
| KR | 20210152885 | A | * | 12/2021 | ........ H01M 10/4285 |

OTHER PUBLICATIONS

Machine Translation of CN 203490042 U (Year: 2014).*
Machine Translation of CN 216348930 U (Year: 2022).*
Machine Translation of KR 20210152885 A (Year: 2021).*
Machine Translation of CN 206496803 U (Year: 2017).*
(Continued)

*Primary Examiner* — Nathaniel J Kolb
(74) *Attorney, Agent, or Firm* — ANOVA LAW GROUP, PLLC

(57) ABSTRACT

A gas volume measurement apparatus configured to monitor volume of gas produced during formation of a battery includes a delivery device and a measurement device. The delivery device connects the battery and the measurement device and is configured to remove hazardous substances from gas produced by the battery and deliver the gas to the measurement device. The measurement device is configured to measure volume of the gas produced by the battery.

8 Claims, 3 Drawing Sheets

(56) References Cited

OTHER PUBLICATIONS

The European Patent Office (EPO) The Extended European Search Report for Application No. 22908830.7, Mar. 14, 2024 9 Pages.

The World Intellectual Property Organization (WIPO) International Search Report with Written Opinion for PCT/CN2022/117978 Jun. 2, 2023 18 pages (including English translation).

* cited by examiner

GAS VOLUME MEASUREMENT APPARATUS

CROSS-REFERENCE TO RELATED APPLICATION

This application is a continuation of International Application No. PCT/CN2022/117978, filed on Sep. 9, 2022, the entire content of which is incorporated herein by reference.

TECHNICAL FIELD

This application relates to the field of battery technologies, and in particular, to a gas volume measurement apparatus.

BACKGROUND

With increasing environmental pollution, the new energy industry has attracted growing attention. For the new energy industry, battery technology is an important factor in connection with its development.

For the development of battery technologies, how performance of batteries is improved is an urgent problem that needs to be solved in battery technologies.

SUMMARY

Given the foregoing problem, embodiments of this application provide a gas volume measurement apparatus for monitoring volume of gas produced during formation of a battery, so as to form a better solid electrolyte interface (Solid Electrolyte Interface, SEI), thereby improving performance of the battery.

According to a first aspect, a gas volume measurement apparatus is provided for monitoring volume of gas produced during formation of a battery. The apparatus includes a delivery device and a measurement device; where the delivery device connects the battery and the measurement device and is configured to remove hazardous substances from gas produced by the battery and deliver the gas to the measurement device; and the measurement device is configured to measure the volume of the gas produced by the battery.

In the embodiments of this application, to prevent undesirable consequences caused by the hazardous substances in the gas produced by the battery, the delivery device connecting the battery and the measurement device removes the hazardous substances first and then delivers the gas to the measurement device, and in turn the measurement device measures the volume of the gas. With provision of the delivery device and the measurement device, where the measurement device is configured to measure the volume of the gas produced by the battery, and the delivery device is configured to deliver the gas and remove the hazardous substances in the gas, the apparatus can monitor the volume of the gas produced during formation of the battery, and help the battery form a better SEI film, thereby improving cycling performance, electrical performance, safety performance, and the like of the battery.

In a possible implementation, the apparatus further includes a processing device, where the processing device is configured to obtain the volume of the gas and calibrate the volume of the gas.

In the embodiments of this application, the gas volume measurement apparatus for monitoring volume of gas produced during formation of the battery includes the delivery device and the measurement device. Further, the measurement device is configured to measure the volume of the gas produced by the battery, and the delivery device is configured to deliver the gas and remove the hazardous substances in the gas. In addition, with provision of the processing device in the apparatus, the processing device obtains a value of the volume of the gas measured by the measurement device and calibrates the value of the volume of the gas, in which case errors introduced during delivery of the gas can be reduced, thereby improving measurement accuracy of the gas volume measurement apparatus.

In a possible implementation, the delivery device includes a gas-washing bottle, where a medium is accommodated in the gas-washing bottle, and the medium is used to dissolve the hazardous substances in the gas.

In the embodiments of this application, a source of the gas produced by the battery is mainly an electrolyte, and the gas includes but is not limited to $H_2$, $CO_2$, HF, and the like. HF and the like are toxic gases. Addition of the gas-washing bottle in the delivery device that delivers the gas and provision of the medium for dissolving toxic substances such as HF in the gas-washing bottle can prevent the gas produced by the battery from damaging devices or causing pollution to the environment.

In a possible implementation, the delivery device includes a buffer bottle, where no medium is accommodated in the buffer bottle, and the buffer bottle is disposed between the battery and the gas-washing bottle.

In the embodiments of this application, the gas-washing bottle is provided in the delivery device to remove the toxic substances in the gas produced by the battery, and the medium is added to the gas-washing bottle. Further addition of the buffer bottle in the delivery device and arrangement of the buffer bottle between the battery and the gas-washing bottle can alleviate a negative pressure phenomenon caused by presence of the medium in the gas-washing bottle, and prevent the medium in the gas-washing bottle from being delivered to the battery under negative pressure which otherwise adversely affects the battery.

In a possible implementation, the medium is water.

In the embodiments of this application, addition of water in the gas-washing bottle can not only remove the hazardous substances such as HF, but also reduce costs of the apparatus, facilitating application in mass production.

In a possible implementation, a first sealing plug and a second sealing plug for capping are provided at mouths of the gas-washing bottle and the buffer bottle respectively, and the first sealing plug and the second sealing plug are both provided with through holes for gas delivery.

In the embodiments of this application, both the gas-washing bottle and the buffer bottle are part of the delivery device. Therefore, both the gas-washing bottle and the buffer bottle are configured to deliver the gas produced by the battery to the measurement device. Provision of the first sealing plug and the second sealing plug at the mouths of the gas-washing bottle and the buffer bottle and provision of the through holes in the first sealing plug and the second sealing plug can prevent leakage of the gas during delivery, so as to successfully deliver the gas to the measurement device.

In a possible implementation, the delivery device further includes delivery tubes, and the delivery tubes are connected to the through holes of the first sealing plug and the second sealing plug.

In the embodiments of this application, to guarantee airtightness of the buffer bottle and the gas-washing bottle, the sealing plugs are disposed at the mouths of both the gas-washing bottle and the buffer bottle, and the sealing plugs are provided with the through holes to ensure normal delivery of the gas. Provision of the delivery tubes and connection of the delivery tubes to the through holes of the first sealing plug and the second sealing plug can ensure successful delivery of the gas to the measurement device.

In a possible implementation, capacities of the gas-washing bottle and the buffer bottle are both not greater than 500 mL.

In the embodiments of this application, the buffer bottle is mainly configured to alleviate the negative pressure phenomenon caused by the presence of the medium in the gas-washing bottle, and the gas-washing bottle is mainly configured to remove the hazardous substances in the gas produced by the battery. The capacities of the buffer bottle and the gas-washing bottle being limited to not greater than 500 mL can not only guarantee functions of the two, but also avoid unnecessary waste.

In a possible implementation, heights of the gas-washing bottle and the buffer bottle are both not greater than 10 cm.

In the embodiments of this application, the heights of the buffer bottle and the gas-washing bottle have some influence on delivery of the gas, especially when the medium such as water is accommodated in the gas-washing bottle. The heights of the gas-washing bottle and the buffer bottle each being limited to not greater than 10 cm can avoid the negative pressure phenomenon in the gas-washing bottle and the buffer bottle as much as possible, and reduce gas loss and gas measurement lag caused by pressure difference of liquid level heights.

In a possible implementation, a calibration formula of the processing device is:

$$V=\left(V_0+\frac{P_1V_1}{P_0}\right)*\frac{T_0+273.15}{T_1+273.15}$$

where V is the calibrated gas volume; $P_0$ is the atmospheric pressure; $T_0$ is initial temperature of the gas; $T_1$ is temperature of the gas measured by the measurement device; $V_0$ is the volume of the gas measured by the measurement device; $P_1$ is a difference between pressure in the gas-washing bottle and $P_0$, and $P_1=\rho gh$, where $\rho$ is density of the medium in the gas-washing bottle, and h is liquid level height in the gas-washing bottle; and $V_1$ is a gas volume of the gas-washing bottle under $P_1$.

In the embodiments of this application, during delivery of the gas from the battery to the processing device, errors are mainly introduced in the following two aspects: One aspect is that a certain pressure difference is generated in the gas-washing bottle due to the presence of the medium, and the gas can be delivered to a flowmeter only after the pressure difference is discharged, and therefore, some gas loss is generated. The other aspect is that when being produced by the battery, the gas has high temperature, which in turn will be reduced after passing through the buffer bottle and the gas-washing bottle, such that the gas has reduced volume after cooled down. Taking the above errors in the two aspects into account allows the processing device to calibrate the volume of the gas measured by the measurement device, further improving the measurement accuracy of the apparatus.

In a possible implementation, the processing device is configured to record the volumes of gas produced by the battery at different stages of formation and generate an analytical curve of the volumes of gas.

In the embodiments of this application, the formation of the battery is a key period for determining whether the battery can form an excellent SEI. Provision of the processing device in the apparatus allows the processing device to record the volumes of gas produced by the battery at different stages of formation and analyze the analytical curve of the volumes of gas. These can be used for verifying and analyzing the volumes of gas produced during formation of the battery under different conditions, facilitating optimization of a production process and subsequent research and development.

In a possible implementation, the processing device is further configured to determine, based on the analytical curve of the volumes of the gas, parameters to be adjusted during formation of the battery.

In the embodiments of this application, the processing device can monitor in real time the volumes of the gas of the battery at different stages of formation and generate the data analytical curve. In addition, the processing device can also determine, based on the analytical curve, whether the volumes of gas produced during formation of the battery are normal, whether the volumes of the gas need to be increased or decreased, and parameters to be adjusted, so as to help form a better SEI film, thus further improving the cycling performance, electrical performance, and safety performance of the battery.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figure 1:
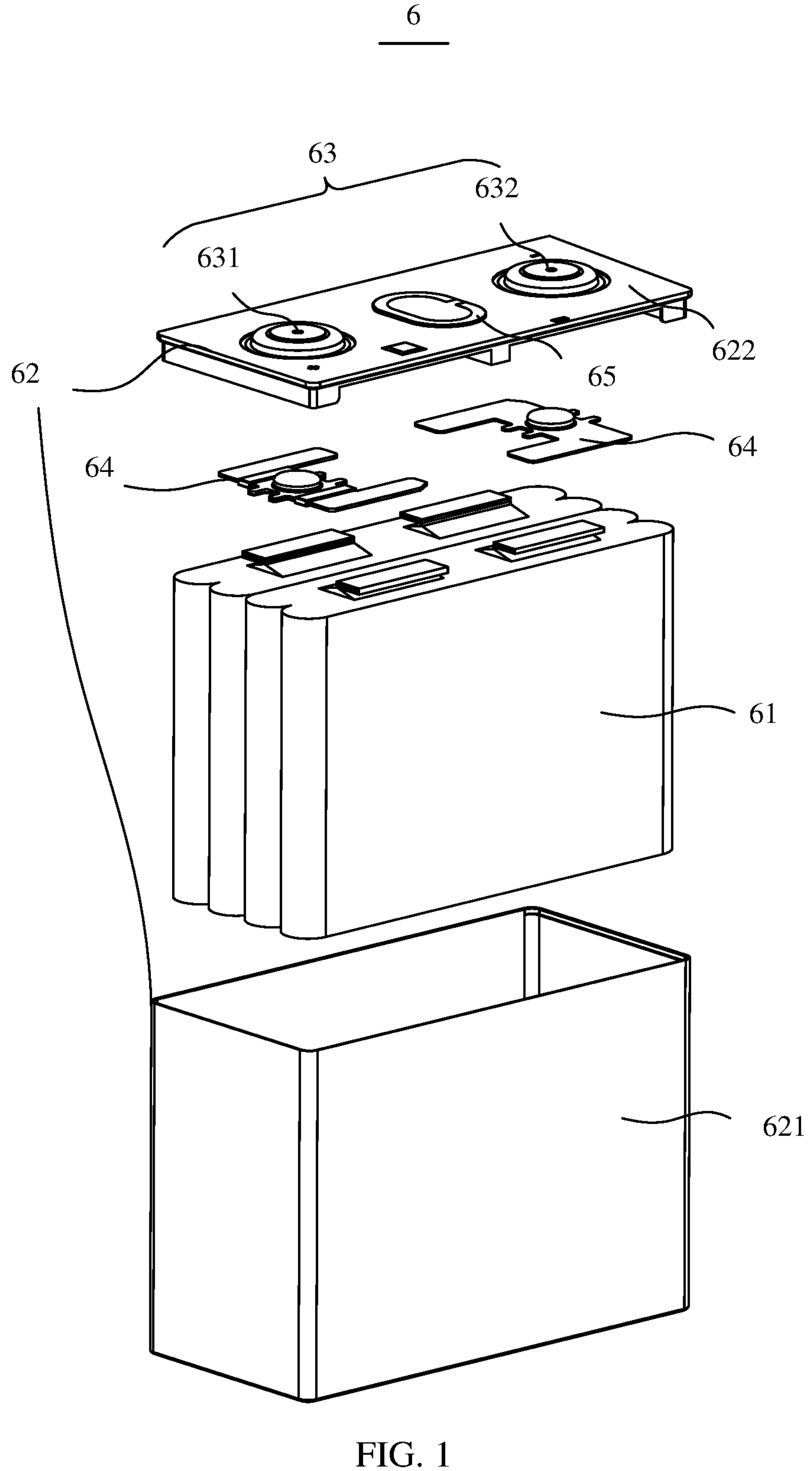
FIG. 1 is a schematic structural exploded view of a battery according to an embodiment of this application.

DESCRIPTION OF REFERENCE SIGNS battery 6; gas volume measurement apparatus 8;

electrode assembly 61; housing 62; electrode terminal 63; connection member 64; pressure relief mechanism 65; delivery device 81; measurement device 82; processing device 83;

housing body 621; end cover 622; positive electrode terminal 631; negative electrode terminal 632; gas-washing bottle 811; buffer bottle 812; through hole 813; delivery tube 814; adapter 815; clamp 816; sealing nail 817;

first sealing plug 8111; and second sealing plug 8121.

DESCRIPTION OF EMBODIMENTS

The following describes in detail the embodiments of technical solutions in this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for the ease and brevity of description of the embodiments of this application rather than indicating or implying that the apparatuses or components mentioned must have specific orientations or must be constructed or manipulated according to specific orientations, and therefore shall not be construed as any limitations on the embodiments of this application.

In the description of the embodiments of this application, unless otherwise specified and defined explicitly, the terms "mount", "connect", "join", and "attach" should be understood in their general senses. For example, they may refer to a fixed connection, a detachable connection, or an integral connection; a mechanical connection or an electrical connection; and a direct connection, an indirect connection via an intermediate medium, or an internal communication between two elements. Persons of ordinary skill in the art can understand specific meanings of these terms in this application as appropriate to specific situations.

In this application, a battery may include a lithium-ion secondary battery, a sodium metal battery, a magnesium metal battery, or the like. This is not limited in the embodiments of this application. The battery may be cylindrical, flat, or another shape. This is not limited in the embodiments of this application either. Batteries are typically divided into three types by packaging method: cylindrical battery, prismatic battery, and pouch battery. This is not limited in the embodiments of this application either. For ease of description, a lithium metal battery is used as example for description of the following embodiments.

After a battery is manufactured, internal positive and negative substances thereof are activated in a specified charge and discharge mode, so as to improve charge and discharge performance, and self-discharge, storage, and other comprehensive performance of the battery. Such process is called formation of the battery. Formation of a lithium metal battery is quite a complicated process, and is also a very important process that affects cycling performance and electrical performance of the battery. This is because when $Li^+$ is in initial charge, the $Li^+$ is intercalated into graphite for the first time, electrochemical reaction takes place in the battery, and a thin carbonized layer covering a surface of a carbon electrode, that is, an SEI film, is inevitably formed on an interface between a carbon negative electrode and an electrolyte in the initial charge of the battery.

In short, the formation of the battery is the formation process of the SEI film, and quality, stability, and optimization of interface of the formed SEI film are crucial for the performance of the battery in all aspects. During formation of the battery, gas such as $CH_4$ and $CO_2$ is produced. Excessively large volume of gas produced by the battery leads to problems such as swelling and deformation, black spots, and lithium precipitation. As a result, increasing measurement devices for measuring volume of gas produced during formation of a battery have emerged.

However, because the gas produced by the battery contains hazardous gas such as HF, long-term operation leads to corrosion of an instrument such as a flowmeter, which affects use of the instrument; and the volume of the gas may not be measured accurately due to corrosion of internal parts during normal life cycles of the instrument.

To resolve the foregoing problems, the embodiments of this application provide a gas volume measurement apparatus for measuring volume of gas produced during formation of a battery, so as to form a better SEI film, thereby improving performance of the battery.

FIG. 1 is a schematic structural diagram of a battery according to an embodiment of this application. As shown in FIG. 1, the battery 6 includes one or more electrode assemblies 61, a housing body 621, and an end cover 622. The housing body 621 and the end cover 622 form a housing or battery box 62. Walls of the housing body 621 and the end cover 622 are referred to as walls of the battery 6. For a prismatic battery 6, the walls of the housing body 621 include a bottom wall and four side walls. The housing body 621 depends on a combined shape of the one or more electrode assemblies 61. For example, the housing body 621 may be a hollow cuboid, a cube, or a cylinder, and one surface of the housing body 621 has an opening for placing the one or more electrode assemblies 61 into the housing body 621. For example, when the housing body 621 is a hollow cuboid or cube, one surface of the housing body 621 is an opening surface, which means that the surface has no wall so that the inside and the outside of the housing body 621 are communicated. When the housing body 621 is a hollow cylinder, an end surface of the housing body 621 is an opening face, which means that the end face has no wall so that the inside and the outside of the housing body 621 are communicated. The end cover 622 covers the opening and joins the housing body 621 to form an enclosed cavity for accommodating the electrode assembly 61. The housing body 621 is filled with an electrolyte such as a liquid electrolyte.

The battery 6 may further include two electrode terminals 63, where the two electrode terminals 63 may be disposed on the end cover 622. The end cover 622 is generally a flat plate, and the two electrode terminals 63 are fastened on a flat surface of the end cover 622. The two electrode terminals 63 are a positive electrode terminal 631 and a negative electrode terminal 632. Each of the electrode terminals 63 is correspondingly provided with one connection member 64, which may alternatively be referred to as a current collection member 64. The connection member 64 is located between the end cover 622 and the electrode assembly 61 and is configured to electrically connect the electrode assembly 61 and the electrode terminals 63.

In the battery 6, one or more electrode assemblies 61 may be provided depending on actual use demands. As shown in FIG. 1, the battery 6 is provided with four separate electrode assemblies 61.

The battery cell 6 may be further provided with a pressure relief mechanism 65. The pressure relief mechanism 65 is configured to be actuated when the internal pressure or temperature of the battery 6 reaches a threshold, so as to relieve internal pressure or temperature of the battery 6.

The pressure relief mechanism 65 may be various possible pressure relief structures. This is not limited in the embodiments of this application. For example, the pressure relief mechanism 65 may be a temperature-sensitive pressure relief mechanism, where the temperature-sensitive pressure relief mechanism is configured to melt when the internal temperature of the battery 6 provided with the pressure relief mechanism 65 reaches a threshold; and/or the pressure relief mechanism 65 may be a pressure-sensitive pressure relief mechanism, where the pressure-sensitive pressure relief mechanism is configured to break when the internal pressure of the battery 6 provided with the pressure relief mechanism 65 reaches a threshold.

Figure 2:
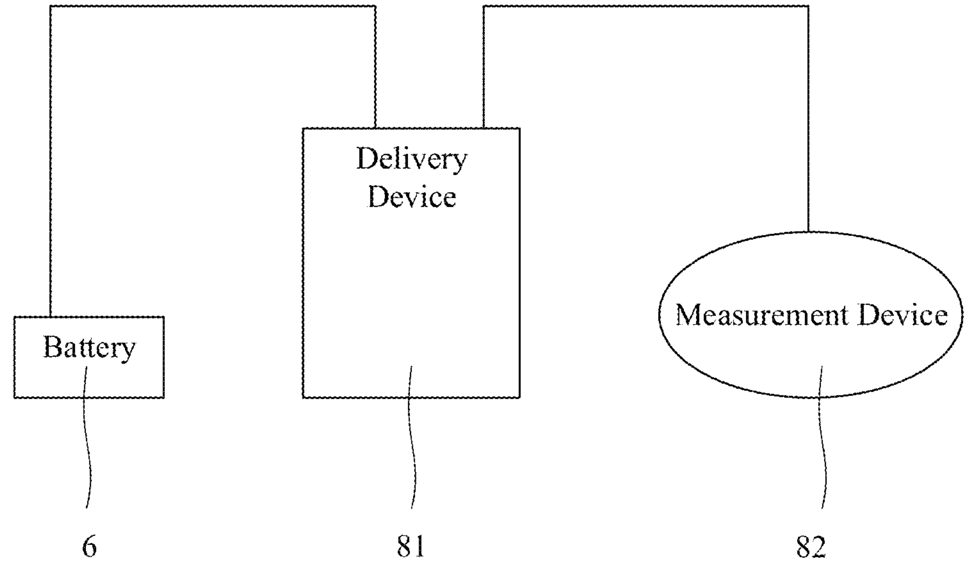
FIG. 2 is a schematic diagram of a gas volume measurement apparatus according to an embodiment of this application.

FIG. 2 is a schematic diagram of a gas volume measurement apparatus according to an embodiment of this application. As shown in FIG. 2, the gas volume measurement apparatus 8 is configured to monitor volume of gas produced during formation of a battery 6 and includes a delivery device 81 and a measurement device 82. The delivery device 81 connects the battery 6 and the measurement device 82 and is configured to remove hazardous substances in the gas produced by the battery 6 and deliver the gas to the measurement device 82. The measurement device 82 is configured to measure volume of the gas produced by the battery 6.

In this embodiment of this application, the hazardous substances include but are not limited to HF gas. HF is colorless and toxic gas with irritating odor under normal condition, with very strong hygroscopicity, produces white fumes upon contact with air, and is easily soluble in water.

In this embodiment of this application, the measurement device 82 may be an ordinary mechanical flowmeter or a flowmeter of another type. This is not limited in this application.

To prevent undesirable consequences caused by the hazardous substances in the gas produced by the battery 6, the delivery device 81 that connects the battery 6 and the measurement device 82 removes the hazardous substances first and then delivers the gas to the measurement device 82, and the measurement device 82 in turn measures the volume of the gas.

In the foregoing solution, with provision of the delivery device 81 and the measurement device 82, where the measurement device 82 is configured to measure the volume of gas produced by the battery 6, and the delivery device 81 is configured to deliver the gas and remove the hazardous substances in the gas, the gas volume measurement apparatus 8 can monitor the volume of gas produced during formation of the battery 6, and help the battery form a better SEI film, thereby improving cycling performance, electrical performance, safety performance, and the like of the battery 6.

In some embodiments, the apparatus further includes a processing device 83, where the processing device 83 is configured to obtain the volume of gas produced by the battery 6 and calibrate the volume of the gas.

In this embodiment of this application, the processing device 83 may be a computer, or may be another instrument capable of processing data.

The gas volume measurement apparatus 8 for monitoring volume of gas produced during formation of the battery 6 includes the delivery device 81 and the measurement device 82. Further, the measurement device 82 is configured to measure the volume of gas produced by the battery 6, and the delivery device 81 is configured to deliver the gas and remove the hazardous substances in the gas. The measurement device 82 only measures the volume of the gas and does nothing to any measured value.

In the foregoing solution, with the provision of the processing device 83 in the apparatus, the processing device 83 obtains a value of the volume of the gas measured by the measurement device 82 and calibrates the value of the volume of the gas. In this way, errors introduced during the delivery of gas can be reduced, thereby improving the measurement accuracy of the gas volume measurement apparatus.

In this embodiment of this application, the processing device 83 and the measurement device 82 may be connected to each other in a wireless or wired manner. This is not limited in this application.

Figure 3:
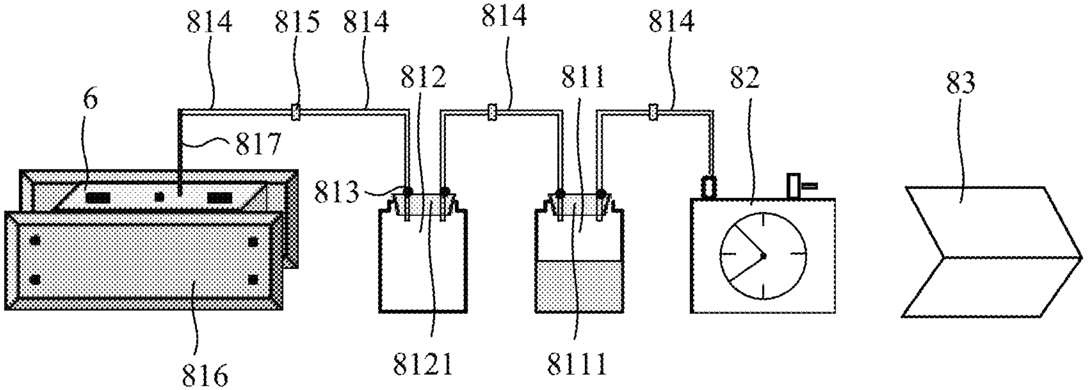
FIG. 3 is a schematic diagram of a gas volume measurement apparatus according to another embodiment of this application.

FIG. 3 is a schematic diagram of a gas volume measurement apparatus according to another embodiment of this application. As shown in FIG. 3, in some embodiments, a delivery device 81 includes a gas-washing bottle 811, where a medium is accommodated in the gas-washing bottle 811, and the medium is used to dissolve hazardous substances in gas.

In this embodiment of this application, no matter whether the battery is a lithium-ion battery, a sodium-ion battery, or another battery, some gas is produced during formation when an SEI film is formed. A source of the gas produced by the battery is mainly an electrolyte, and the gas includes but is not limited to $H_2$, $CO_2$, and HF. The hazardous substances are mainly HF.

In the foregoing solution, addition of the gas-washing bottle 811 in the delivery device 81 that delivers the gas and provision of the medium for dissolving the hazardous substances such as HF in the gas-washing bottle 811 can prevent the gas produced by the battery 6 from damaging devices or causing pollution to the environment.

In some embodiments, the delivery device 81 includes a buffer bottle 812, where no medium is accommodated in the buffer bottle 812, and the buffer bottle 812 is disposed between the battery 6 and the gas-washing bottle 811.

The gas-washing bottle 811 is provided in the delivery device 81 to remove the toxic substances in the gas produced by the battery 6, and the medium is added to the gas-washing bottle 811. When the medium in the gas-washing bottle 811 is liquid, a negative pressure may occur, and if the battery 6 is directly connected to the gas-washing bottle 811, the liquid in the gas-washing bottle 811 may be sucked back into the battery 6, which is extremely harmful to the performance of the battery 6.

It should be noted herein that absence of a medium in the buffer bottle 812 does not necessarily mean that there is no medium in the buffer bottle 812 at all time during delivery of the gas. As mentioned above, the role of the buffer bottle 812 is to prevent the gas-washing bottle 811 from delivering the medium into the battery 6 due to the negative pressure phenomenon. Therefore, during delivery of the gas, the medium present in the buffer bottle 812 is delivered from the gas-washing bottle 811 to the buffer bottle 812 due to the negative pressure phenomenon and is not specifically provided in the buffer bottle 812.

In the foregoing solution, further addition of the buffer bottle 812 in the delivery device 81 and arrangement of the buffer bottle 812 between the battery 6 and the gas-washing bottle 812 can alleviate the negative pressure phenomenon caused by presence of the medium in the gas-washing bottle 811, and prevent the medium from being delivered to the battery 6 under negative pressure which otherwise adversely affects the battery 6.

In some embodiments, the medium is water.

In this embodiment of this application, the toxic substances produced by the battery during formation are mainly HF gas, which is highly soluble in water.

In this embodiment of this application, when the medium in the gas-washing bottle 811 is water, volume of water accommodated in the gas-washing bottle 811 does not exceed half of the volume of the gas-washing bottle 811.

In the foregoing solution, addition of water in the gas-washing bottle 811 can not only remove hazardous substances such as HF, but also reduce costs of the apparatus, facilitating application in mass production.

In some embodiments, a first sealing plug 8111 and a second sealing plug 8121 for capping are provided at mouths of the gas-washing bottle 811 and the buffer bottle 812 respectively, and the first sealing plug 8111 and the second sealing plug 8121 are both provided with through holes 813 for gas delivery.

Both the gas-washing bottle 811 and the buffer bottle 812 belong to the delivery device 81. Therefore, both the gas-washing bottle 811 and the buffer bottle 812 are further configured to deliver the gas produced by the battery to the measurement device 82.

In the foregoing solution, provision of the first sealing plug 8111 and the second sealing plug 8121 at the mouths of the gas-washing bottle 811 and the buffer bottle 812 and provision of the through holes 813 in the first sealing plug 8111 and the second sealing plug 8121 can prevent leakage of the gas during delivery, so as to successfully deliver the gas to the measurement device 82.

In this embodiment of this application, to strengthen sealing effects between the first sealing plug 8111 and the gas-washing bottle 811 and between the second sealing plug 8121 and the buffer bottle 812, structural adhesive may be applied around the first sealing plug 8111 and the second sealing plug 8121.

In this embodiment of this application, the first sealing plug 8111 and the second sealing plug 8121 may be rubber plugs, or may be wooden plugs, provided that the two can play the role of sealing the gas-washing bottle 811 and the buffer bottle 812. Materials of the sealing plugs are not particularly limited in this application. In addition, sizes of the first sealing plug 8111 and the second sealing plug 8121 are not particularly limited in this application either, provided that they are adapted to the diameters of the mouths of the gas-washing bottle 811 and the buffer bottle 812.

In this embodiment of this application, the shape, size, quantity, and the like of the through holes 813 are not particularly limited either and are set depending on requirements of actual production.

In some embodiments, the delivery device 81 further includes delivery tubes 814, where the delivery tubes 814 are connected to the through holes 813 of the first sealing plug 8111 and the second sealing plug 8121.

To guarantee airtightness of the gas-washing bottle 811 and the buffer bottle 812, the sealing plugs are disposed at the mouths of both the gas-washing bottle 811 and the buffer bottle 812, and the sealing plugs are provided with the through holes 813 to ensure normal delivery of the gas.

In the foregoing solution, provision of the delivery tubes 814 and connection of the delivery tubes 814 to the through holes 813 of the first sealing plug 8111 and the second sealing plug 8121 can ensure smooth delivery of the gas to the measurement device 82.

In this embodiment of this application, the delivery tubes 814 may be Teflon delivery tubes or made of other materials. This is not limited in this application, provided that the delivery tubes 814 are not corroded or damaged by HF or other gas.

In addition, to facilitate cleaning, use of excessively long delivery tubes 814 may be avoided. If an excessively long delivery path is required, adapters 815 shown in FIG. 3 may be used to implement sealed connection between different delivery tubes 814, and to strengthen sealing, structural adhesive may also be applied on the adapters 815. The adapters 815 may be stainless steel adapters 815 or adapters 815 of another type.

As shown in FIG. 3, the first sealing plug 8111 and the second sealing plug 8121 are both provided with two through holes 813, and the delivery tubes 814 are inserted into the through holes 813 to deliver gas. To guarantee airtightness of the first sealing plug 8111 and the second sealing plug 8121, structural adhesive may be applied at joints between the delivery tubes 814 and the sealing plugs (where the delivery tubes 814 are inserted into the through holes 813).

In this embodiment of this application, a clamp 816 shown in FIG. 3 may be used to clamp the battery 6. The clamp 816 can apply enough preload force on the battery 6 such that the battery 6 can discharge gas promptly when producing gas. In addition, the clamp 816 can also fix the battery 6 and prevent deformation of the battery 6. The clamp 816 may be made of steel or aluminum, or other materials. This is not limited in this application.

In this embodiment of this application, the battery 6 is provided with an opening (not shown in the figure) for discharging gas out of the battery 6. To further guarantee airtightness of the apparatus, a sealing nail 817 is provided between the opening of the battery 6 and the delivery tube 814, so as to prevent leakage of gas.

In this embodiment of this application, a size of the opening of the battery 6, the tube diameter of the delivery tube 814, and the size of the through hole 813 should be equal.

In some embodiments, capacities of the gas-washing bottle 811 and the buffer bottle 812 are both not greater than 500 mL.

The buffer bottle 812 is mainly used to reduce the negative pressure phenomenon caused by the presence of the medium in the gas-washing bottle 811, and the gas-washing bottle 811 is mainly used to remove the hazardous substances in the gas produced by the battery 6.

In the foregoing solution, the capacities of the buffer bottle 812 and the gas-washing bottle 811 being limited to not greater than 500 mL can not only guarantee functions of the two but also avoid unnecessary waste.

In some embodiments, heights of the gas-washing bottle 811 and the buffer bottle 812 are both not greater than 10 cm.

The heights of the buffer bottle 812 and the gas-washing bottle 811 have some influence on delivery of the gas, especially when the medium such as water is accommodated in the gas-washing bottle 811.

In the foregoing solution, the heights of the gas-washing bottle 811 and the buffer bottle 812 being limited to not greater than 10 cm can avoid the negative pressure phenomenon in the gas-washing bottle 811 and the buffer bottle 812 as much as possible, and reduce gas loss and gas measurement lag due to pressure difference caused by liquid level height.

In some embodiments, a calibration formula of the processing device 83 is:

$$V = \left(V_0 + \frac{P_1 V_1}{P_0}\right) * \frac{T_0 + 273.15}{T_1 + 273.15}$$

where V is the calibrated gas volume; $P_0$ is the atmospheric pressure; $T_0$ is initial temperature of the gas; $T_1$ is temperature of the gas measured by the measurement device 82; $V_0$ is the volume of the gas measured by the measurement device 82; $P_1$ is difference between pressure in the gas-washing bottle 811 and $P_0$, and $P1=\rho gh$, where ρ is density of the medium in the gas-washing bottle 811, and h is liquid level height in the gas-washing bottle 811; and $V_1$ is a gas volume of the gas-washing bottle 811 under $P_1$.

In this embodiment of this application, errors of the measurement device 82 are mainly introduced in two aspects: One aspect is that gas is introduced into the gas-washing bottle 811; and the other aspect is that volume is reduced due to cooling of the gas passing through the gas-washing bottle 811 and the buffer bottle 812.

For the first aspect, when water or another liquid medium is present in the gas-washing bottle 811, the liquid medium has a liquid level height, which causes a certain pressure difference, so the gas can only enter the measurement device 82 after the pressure difference is discharged, and some gas loss is required for discharging the certain pressure difference.

For the second aspect, generally, a temperature of an environment in which the battery 6 is located is higher than a room temperature, mostly 45° C. (sometimes up to 55° C.). The apparatus is at room temperature, meaning that the gas temperature has been reduced by the time the delivery device 81 delivers the gas to the measurement device 82, and cooling of the gas also indicates a smaller gas volume.

To sum up, calibrated gas volume=(gas volume measured by measurement device+gas volume due to pressure loss)*(temperature at time of gas production/temperature at time of measurement).

In the foregoing solution, taking the above errors in the two aspects into account allows the processing device 83 to calibrate the volume of the gas measured by the measurement device 82, further improving the measurement accuracy of the apparatus.

Figure 4:
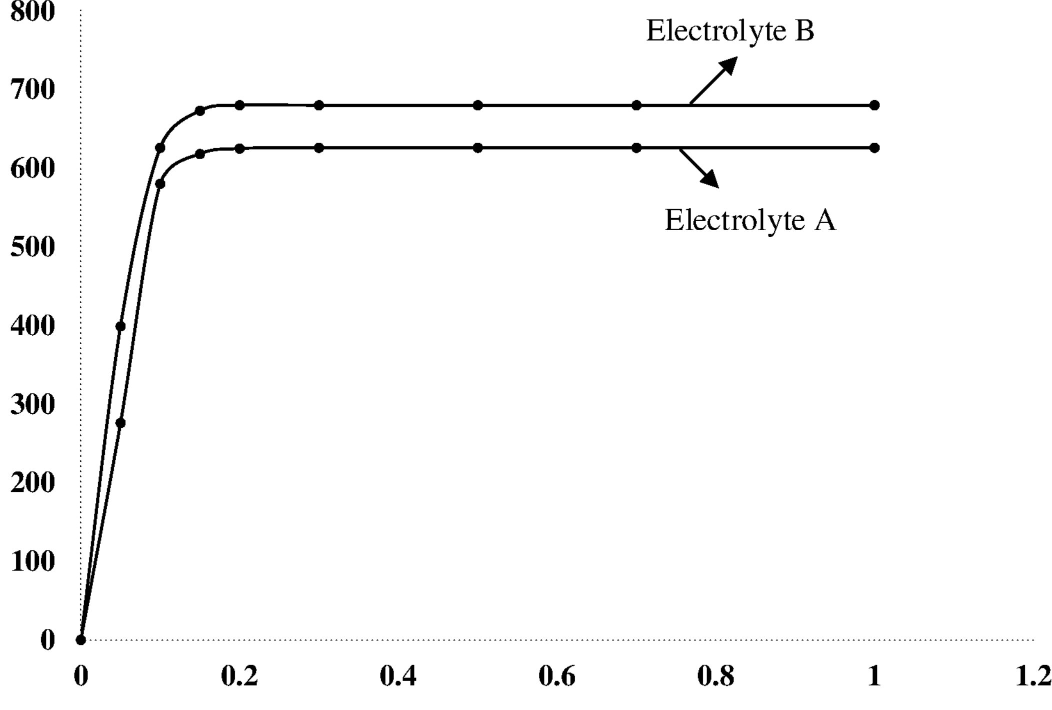
FIG. 4 shows an analytical curve corresponding to Table 1.

Table 1 shows volumes of gas produced at different stages of formation measured by a gas volume measurement apparatus according to an embodiment of this application. FIG. 4 shows an analytical curve corresponding to Table 1. As shown in Table 1 and FIG. 4, in some embodiments, the processing device 83 is configured to record the volumes of gas produced by the battery 6 at different stages of formation and generate an analytical curve of the volumes of gas.

TABLE 1

| | Volume of gas produced (mL) | |
|---|---|---|
| Formation of battery | Electrolyte A | Electrolyte B |
| 0% | 0 | 0 |
| 5% | 376 | 399 |
| 10% | 580 | 626 |
| 15% | 618 | 673 |
| 20% | 625 | 680 |
| 30% | 626 | 680 |
| 50% | 626 | 680 |
| 70% | 626 | 680 |
| 100% | 626 | 680 |

It can be learned from Table 1 and FIG. 4 that less gas is produced for electrolyte A, more gas is produced for electrolyte B, gas production is concentrated in the first 20% of the formation, and the volume of the gas needs to be increased in the first 20% of the formation in a mass production process.

In the foregoing solution, the formation of the battery 6 is a key period for determining whether the battery 6 can form a better SEI or not. Provision of the processing device 83 in the apparatus allows the processing device 83 to record the volume of the gas of the battery 6 at different stages of formation and analyze the analytical curve of the volume of the gas. These can be used for verifying and analyzing the volume of gas produced during formation of the battery 6 under different conditions, facilitating optimization of a production process and subsequent research and development.

In some embodiments, the processing device 83 is further configured to determine, based on the analytical curve of the volume of the gas, parameters to be adjusted during formation of the battery 6.

Still referring to Table 1 and FIG. 4, as already learned from Table 1 and FIG. 4, the volume of gas produced by the battery mainly lies in the first 20% of the formation, so more attention should be paid to the volume of the gas in the first 20% of the formation in subsequent operations. In addition, with reference to different characteristics of different batteries 6, it can be analyzed whether the volume of the gas at this point needs to be increased or decreased, or some other parameters to be adjusted.

In the foregoing solution, the processing device 83 can monitor in real time the volumes of the gas of the battery 6 at different stages of formation and generate the data analytical curve. In addition, the processing device 83 can also determine, based on the analytical curve, whether the volumes of gas produced during formation are normal, whether the volumes of the gas need to be increased or decreased, and parameters to be adjusted, so as to help form a better SEI film, thus further improving the cycling performance, electrical performance, and safety performance of the battery 6.

According to some embodiments of this application, referring to FIG. 3, an embodiment of this application provides a gas volume measurement apparatus for measuring volume of gas produced by the battery 6. The battery 6 is fixed by the clamp 816, and the battery 6 is provided with an opening. After the battery 6 produces gas, the gas is delivered to a buffer bottle 812, a gas-washing bottle 811, and a measurement device 82 in sequence through a sealing nail 817 and delivery tubes 814. The gas-washing bottle 811 and the buffer bottle 812 are both provided with a sealing plug, and the sealing plugs are both provided with the through holes to ensure normal delivery of the gas. The measurement device 82 measures volumes of the gas and delivers the values to a processing device 83. The processing device records in real time the volumes of gas produced by the battery to generate the analytical curve, and determines the parameters to be adjusted during formation of the battery.

Although this application has been described with reference to some embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A gas volume measurement apparatus for monitoring volume of gas produced during formation of a battery, comprising:

a delivery device, a measurement device, and a processing device;

wherein:

the delivery device connects the battery and the measurement device and is configured to remove hazardous substances from gas produced by the battery and deliver the gas to the measurement device, the delivery device comprising a gas-washing bottle accommodating a liquid medium, wherein the gas produced by the battery is delivered through the liquid medium in the gas-washing bottle to dissolve the hazardous substances in the gas;

the measurement device is configured to measure volume of the gas produced by the battery, the measurement device comprises a flowmeter that outputs an uncalibrated measured gas volume; and the processing device is configured to obtain the uncalibrated measured gas volume and compute a calibrated gas volume value based on the uncalibrated measured gas volume, a liquid level height of the liquid medium in the gas-washing bottle, a gas volume of the gas-washing bottle, a temperature of the gas at a time the gas is produced, and a temperature of the gas measured at the measurement device, wherein the computing of the calibrated gas volume value corrects for errors associated with gas loss in the gas-washing bottle and a temperature difference of the gas between the time the gas is produced and a time the volume of the gas is measured at the measurement device.

2. The apparatus according to claim 1, wherein the liquid medium is water.

3. The apparatus according to claim 1, wherein the delivery device further comprises a buffer bottle, wherein no medium is accommodated in the buffer bottle, and the buffer bottle is disposed between the battery and the gas-washing bottle.

4. The apparatus according to claim 3, wherein a first sealing plug and a second sealing plug for capping are provided at mouths of the gas-washing bottle and the buffer bottle respectively, wherein the first sealing plug and the second sealing plug are both provided with through holes for gas delivery.

5. The apparatus according to claim 4, wherein the delivery device further comprises delivery tubes, wherein the delivery tubes are connected to the through holes of the first sealing plug and the second sealing plug.

6. The apparatus according to claim 3, wherein capacities of the gas-washing bottle and the buffer bottle are both not greater than 500 mL.

7. The apparatus according to claim 3, characterized in that heights of the gas-washing bottle and the buffer bottle are both not greater than 10 cm.

8. The apparatus according to claim 1, wherein the processing device is further configured to record the volumes of gas produced by the battery at different stages of formation and generate an analytical curve of the volumes of gas.

* * * * *